United States Patent
Roth

(10) Patent No.: US 11,767,027 B2
(45) Date of Patent: Sep. 26, 2023

(54) METHOD AND SYSTEM FOR PERFORMING RECUPERATION

(71) Applicant: AUDI AG, Ingolstadt (DE)

(72) Inventor: Andreas Roth, Kipfenberg-Böhming (DE)

(73) Assignee: AUDI AG, Ingolstadt (DE)

(*) Notice: Subject to any disclaimer, the term of this patent is extended or adjusted under 35 U.S.C. 154(b) by 130 days.

(21) Appl. No.: 17/066,861

(22) Filed: Oct. 9, 2020

(65) Prior Publication Data

US 2021/0171058 A1 Jun. 10, 2021

(30) Foreign Application Priority Data

Dec. 10, 2019 (DE) ...................... 10 2019 133 680.5

(51) Int. Cl.
*B60W 60/00* (2020.01)
*B60W 30/095* (2012.01)
(Continued)

(52) U.S. Cl.
CPC ...... *B60W 60/001* (2020.02); *B60W 30/0956* (2013.01); *B60W 30/16* (2013.01);
(Continued)

(58) Field of Classification Search
CPC ........... B60W 60/001; B60W 30/0956; B60W 30/16; B60W 2420/42; B60W 2554/40; B60W 2554/80; B60W 50/0097; B60W 2554/802; B60W 2556/50; B60W 2556/55; B60W 10/08; B60W 10/24; B60W 20/14;
(Continued)

(56) References Cited

U.S. PATENT DOCUMENTS

| 2017/0076606 A1* | 3/2017 | Gupta | ............... B60K 35/00 |
| 2018/0075759 A1* | 3/2018 | Kim | ............ G08G 1/096827 |

(Continued)

FOREIGN PATENT DOCUMENTS

| DE | 102008035429 A1 * | 4/2009 | ............. B60R 1/00 |
| DE | 102010026769 A1 * | 4/2011 | ............ B60W 10/06 |

(Continued)

OTHER PUBLICATIONS

Machine Translation: KR-20170116608-A (year:2017).*
(Continued)

*Primary Examiner* — Aaron L Troost
*Assistant Examiner* — Connor L Knight
(74) *Attorney, Agent, or Firm* — Maier & Maier, PLLC

(57) ABSTRACT

A method for performing recuperation for an ego vehicle, which has at least one electrical machine and is located with at least one further road user on a route in a traffic situation, wherein a drone which has at least one camera is used, wherein the ego vehicle is accompanied on the route by the flying drone, wherein the traffic situation in which the ego vehicle is located is acquired using the at least one camera, wherein the recuperation for the ego vehicle is performed in dependence on the acquired traffic situation, wherein mechanical energy of the ego vehicle is converted into electrical energy using the at least one electrical machine during performance of the recuperation for the ego vehicle.

15 Claims, 1 Drawing Sheet

(51) Int. Cl.

| | |
|---|---|
| *B60W 30/16* | (2020.01) |
| *B64C 39/02* | (2023.01) |
| *G01C 21/34* | (2006.01) |
| *G01C 21/36* | (2006.01) |
| *G05D 1/00* | (2006.01) |
| *G05D 1/10* | (2006.01) |
| *G05D 1/12* | (2006.01) |
| *G08G 1/01* | (2006.01) |
| *B64U 101/20* | (2023.01) |
| *B64U 101/30* | (2023.01) |

(52) U.S. Cl.
CPC ........ B64C 39/024 (2013.01); G01C 21/3407 (2013.01); G01C 21/3691 (2013.01); G05D 1/0094 (2013.01); G05D 1/101 (2013.01); G05D 1/12 (2013.01); G08G 1/012 (2013.01); G08G 1/0133 (2013.01); *B60W 2420/42* (2013.01); *B60W 2554/40* (2020.02); *B60W 2554/80* (2020.02); *B64U 2101/20* (2023.01); *B64U 2101/30* (2023.01)

(58) Field of Classification Search
CPC ................ B60W 40/04; B64C 39/024; B64C 2201/122; B64C 2201/127; B64C 39/02; G01C 21/3407; G01C 21/3691; G05D 1/0094; G05D 1/101; G05D 1/12; G08G 1/012; G08G 1/0133; G08G 1/0965; G08G 1/096791; Y02T 10/64; Y02T 90/16; Y02T 10/72; B60L 2200/10; B60L 15/2009; B60L 2240/62; B60L 7/10

See application file for complete search history.

(56) References Cited

U.S. PATENT DOCUMENTS

| | | | | |
|---|---|---|---|---|
| 2020/0020231 | A1* | 1/2020 | Dhiman | G06V 20/588 |
| 2020/0377120 | A1* | 12/2020 | Thörn | G06V 20/56 |
| 2021/0094577 | A1* | 4/2021 | Shalev-Shwartz | G06V 20/58 |
| 2021/0221507 | A1* | 7/2021 | Baur | G06V 20/17 |

FOREIGN PATENT DOCUMENTS

| | | | | |
|---|---|---|---|---|
| DE | 10 2012 002 091 A1 | | 8/2013 | |
| DE | 102012222507 A1 | * | 6/2014 | ......... B60L 15/2009 |
| DE | 10 2014 226 458 A1 | | 6/2016 | |
| DE | 10 2016 001 827 A1 | | 8/2017 | |
| DE | 102016001827 A1 | * | 8/2017 | .......... B64C 39/024 |
| DE | 10 2016 211 859 A1 | | 1/2018 | |
| DE | 102016122686 A1 | * | 5/2018 | ....... G08G 1/096716 |
| JP | 2016068814 A | * | 5/2016 | |
| KR | 101580609 B1 | * | 12/2015 | |
| KR | 20170116608 A | * | 10/2017 | |
| WO | WO-2012004842 A1 | * | 1/2012 | .......... B60L 15/2009 |

OTHER PUBLICATIONS

Machine Translation: KR-101580609-B1 (year:2015).*
Machine Translation: DE-102016122686-A1 (year:2018).*
Machine Translation: DE-102016001827-A1 (year:2017).*
Machine Translation: DE-102012222507-A1 (year:2014).*
Machine Translation: DE-102010026769-A1 (year:2011).*
Machine Translation: WO-2012004842-A1 (Year: 2012).*
Machine Translation: JP-2016068814-A (Year: 2016).*
Machine Translation: DE-102008035429-A1 (Year: 2009).*
Examination Report dated Jul. 27, 2020 in corresponding German application No. 10 2019 133 680.5; 10 pages including Machine-generated English-language translation.

* cited by examiner

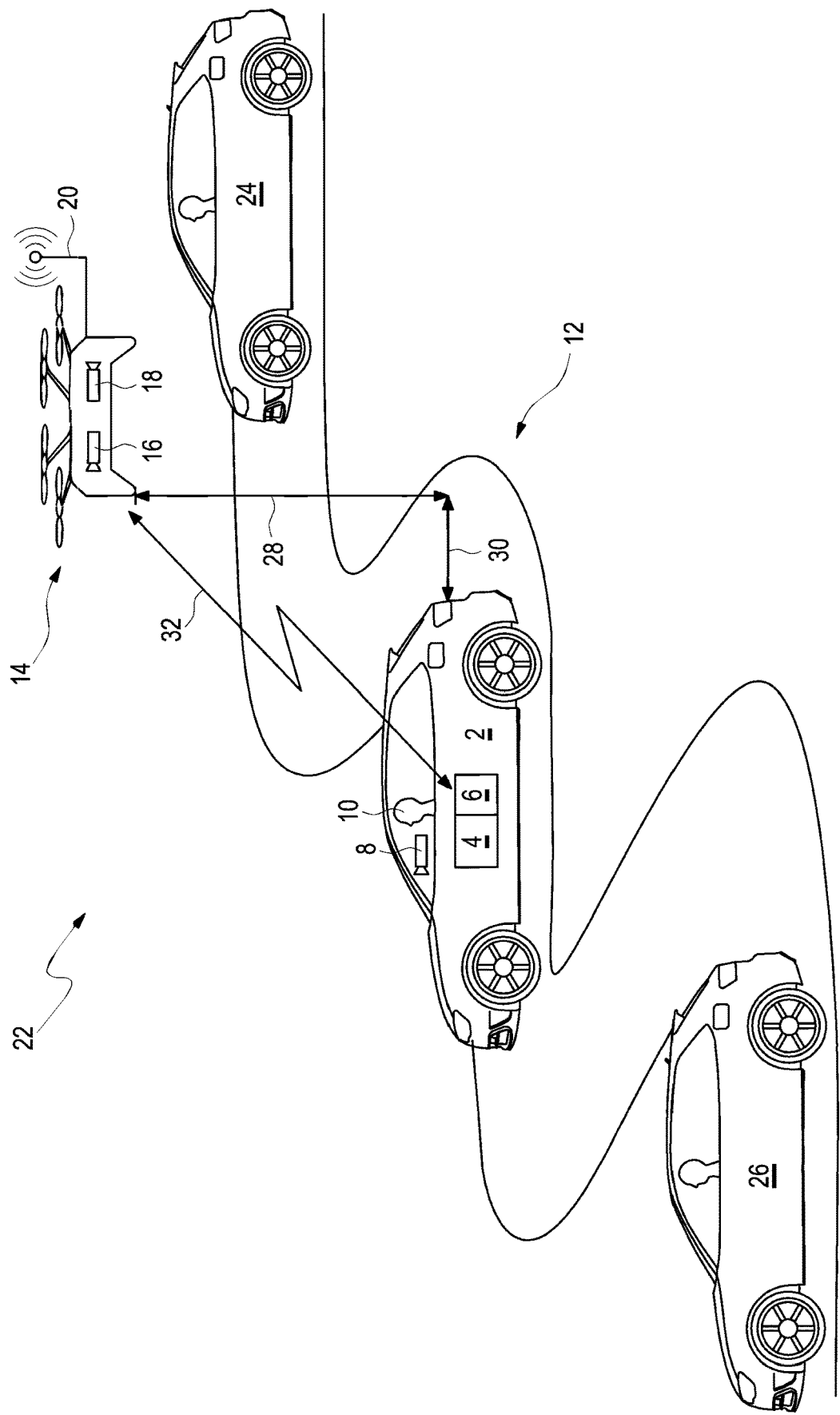

METHOD AND SYSTEM FOR PERFORMING RECUPERATION

FIELD

The disclosure relates to a method for performing recuperation for a vehicle and a system for performing recuperation for a vehicle.

BACKGROUND

Document DE 10 2016 001 827 A1 describes a method for operating a vehicle and a system having a vehicle and at least one unmanned aircraft.

A method for optimizing a traffic flow of a traffic route having multiple lanes is known from document DE 10 2016 211 859 A1.

A method and a system for controlling an autonomously movable missile coupled with a vehicle in terms of data technology are known from document DE 10 2014 226 458 A1

SUMMARY

Against this background, it was an object to better plan recuperation of a vehicle.

The method according to the disclosure is provided for performing recuperation for an ego vehicle, wherein the ego vehicle has at least one electrical machine and is located with at least one further road user, for example at least one third-party vehicle, on and/or along a route in a traffic situation, wherein a drone which has at least one camera as a component of a camera system is used, wherein the ego vehicle is accompanied by the drone flying on and/or along the route, wherein the traffic situation in which the ego vehicle is located with the at least one further road user is optically acquired, observed, and/or recorded by the at least one camera of the flying drone which accompanies the ego vehicle, wherein the traffic situation can be analyzed, wherein the recuperation for the ego vehicle is performed, for example initiated in dependence on the acquired traffic situation, on the basis of the acquired or observed traffic situation, and/or in consideration of the acquired traffic situation, wherein it is possible that performing the recuperation is planned. Upon performance of the recuperation for the ego vehicle, mechanical energy of the ego vehicle is converted into electrical energy using the at least one electrical machine and stored in an electrical energy storage unit of the ego vehicle.

Using the at least one camera of the drone, in consideration of a travel direction of the ego vehicle, the at least one further road user, for example the at least one third-party vehicle, which is located on an upcoming section of the route still to be traveled by the ego vehicle driving ahead of or coming toward the ego vehicle at the moment and/or at least one further road user, for example the at least one third-party vehicle, which is located on a previous section of the route already traveled by the ego vehicle, for example presently driving behind the ego vehicle at the moment, and/or at least one road user, for example the at least one third-party vehicle which is located next to the ego vehicle on a section traveled at the moment or presently by the ego vehicle, is acquired or observed, wherein the traffic situation is analyzed on the basis of the at least one acquired further road user. A length of a respective section is dependent on the range and/or clear view of the at least one camera.

In the method, at least one kinematic parameter is ascertained, for example a position or a location at which the at least one further road user is located along the route at a moment, a velocity of the at least one further road user at the moment, and/or an acceleration of the at least one further road user at the moment. In addition, at least one corresponding kinematic parameter of the ego vehicle at the moment is taken into consideration.

The recuperation is performed along the section of the route still to be traveled in future by the ego vehicle in its travel direction, wherein a future traffic situation is predicted on the basis of a traffic situation acquired at a moment and/or the recuperation is performed in dependence on or in consideration of the predicted traffic situation, wherein the future traffic situation is ascertained and/or predicted starting from the traffic situation acquired at the moment in consideration of the at least one kinematic parameter of the at least one further road user acquired at the moment. Correspondingly, at least one future kinematic parameter of the ego vehicle, for example braking as a negative acceleration, is performed during the recuperation to be performed.

In the method, a shape or structure or nature of the route, in particular the section of the route still to be traveled by the ego vehicle in the future, can also be acquired by the at least one camera of the drone, by at least one camera of the vehicle which is oriented toward the front in the travel direction of the vehicle and/or toward the rear against the travel direction of the vehicle, and/or by at least one navigation system of the ego vehicle, wherein it is checked whether the route has at least one linear section, at least one curve, at least one horizontal section, at least one ascent, and/or at least one descent, wherein the shape or structure of the route is taken into consideration in addition to the traffic situation due to the further road user when performing, for example initiating, the recuperation.

Furthermore, the traffic situation in which the ego vehicle is located, having the at least one further road user, can be optically acquired using the at least one camera of the ego vehicle, wherein the at least one further road user is additionally recorded or observed by the at least one camera of the ego vehicle.

The planned recuperation to be performed is only performed and correspondingly initiated if a safety distance having a minimal length is located in the travel direction behind the ego vehicle in relation to each at least one further road user following or driving behind, for example in relation to a directly following road user, wherein such a minimal length is dependent on at least one future plannable settable kinematic operating parameter of the ego vehicle and at least one future predictable kinematic operating parameter of the at least one further road user.

The recuperation is initiated automatically and/or as needed if sufficient free capacity for storing electrical energy is present in the electrical energy storage unit of the ego vehicle.

In a further design of the method, a signal is provided to the at least one further road user, for example the at least one third-party vehicle, typically by the ego vehicle and/or possibly by the drone that accompanies the ego vehicle, via radio or electromagnetically, which informs the at least one further road user that the recuperation, for example forced recuperation is or will be performed for the ego vehicle. Accordingly, a following third-party vehicle can be notified by the signal of the ego vehicle and/or the drone about the recuperation to be performed by the ego vehicle.

It is possible here that using the at least one camera of the camera system of the drone (UAV) and possibly the camera of the ego vehicle, the at least one third-party vehicle, for example a following third-party vehicle, which has a marking, for example a special and/or defined registration marking, can be detected, sensed, and/or identified. It is thus possible that the ego vehicle intentionally makes contact with the identified third-party vehicle, for example via a radio-supported vehicle-to-vehicle communication, and provides this third-party vehicle with the signal that informs about the recuperation. In this way, the third-party vehicle, which is following in particular, is prepared for the ego vehicle to slow down due to the recuperation to be performed. If the following third-party vehicle also has at least one electrical machine using which it is driven, it can take the provided signal as an opportunity to also perform a recuperation, for example synchronously with the ego vehicle. The signal provided to the third-party vehicle can moreover contain information that the ego vehicle performs or can perform the recuperation because the traffic situation in which the ego vehicle, and also the third-party vehicle, is located is acquired or has been acquired by the drone.

The system according to the disclosure is designed to perform recuperation for an ego vehicle which has at least one electrical machine and is located with at least one further road user on a route in a traffic situation. The system has a drone, which has at least one camera, and at least one control unit, wherein the drone is designed to accompany the ego vehicle on the route while flying in the air, wherein the at least one camera of the flying drone is designed to optically acquire or record the traffic situation in which the ego vehicle is located with the at least one further road user. In one design, the at least one control unit is designed to analyze the traffic situation. The at least one control unit is furthermore designed to effectuate and/or initiate performance of the recuperation for the ego vehicle in dependence on and/or in consideration of the acquired traffic situation. The at least one electrical machine is designed to convert mechanical energy of the ego vehicle into electrical energy upon performance of the recuperation for the ego vehicle and to store it in an electrical energy storage unit of the ego vehicle.

The at least one control unit or a corresponding control device is arranged in the ego vehicle and/or in the drone.

The presented method and the presented system are provided and/or designed to perform intelligent recuperation of the vehicle. The at least one control device is designed as assistance or to support a driver of the ego vehicle in order to plan the recuperation in consideration of items of information about the traffic which are provided and/or transmitted to it by the drone which accompanies the ego vehicle while flying and furthermore to start it if a predicted traffic situation permits it, but also to end it again. For this purpose, the at least one electrical machine is activated accordingly by the control device. A possibility or opportunity to perform the recuperation is recognized predictively here by the drone and the control device. The method is provided or can be performed for an ego vehicle, for example a motor vehicle, having electric drive or hybrid drive. The support of the driver for predictive recuperation can be increased using the method and the system.

The drone is associated in this case with the ego vehicle, which is designed and/or to be referred to as a motor vehicle, for example. In addition, a navigation system, for example GPS of the ego vehicle, at least one camera of the ego vehicle, for example a first camera which is oriented in the travel direction, and a second camera which is oriented against the travel direction, can additionally be used. The at least one control device can also be designed and/or referred to as the at least one control unit, wherein a control unit is designed to perform an interface correspondence to a topology made up of further control units, which are arranged in a drive system having the at least one electrical machine, a supply system having the energy storage unit, and/or a CAN system or vehicle electrical system of the ego vehicle, wherein the control units exchange information with one another during the method.

In one embodiment of the method, the drone associated with the ego vehicle accompanies the ego vehicle along a predefined route, wherein the drone flies at a specific distance in at least one direction, i.e. spatial direction, for example x, y, and/or z direction in relation to the driving vehicle, wherein the drone, due to its spatial arrangement with respect to the vehicle more or less from the bird's eye perspective, has a better overview of the current traffic, for example a current traffic situation, a current traffic density, and/or a current traffic volume, than the ego vehicle. Images of the traffic situation having the further road users are recorded and processed in real time by the drone, i.e. by the at least one camera of the drone, wherein the at least one control unit in the vehicle can also process data and/or information. With the aid of or using the images, data, and/or information, in a first processing step, with respect to or in consideration of the traffic density of the traffic acquired by the drone and possibly also in consideration of predictive navigation data, a better forecast for performing, for example planning, the recuperation can be implemented, if it is reasonable, for example with respect to the traffic to be expected and/or predicted, for example the traffic situation, the traffic density, and/or the traffic volume, and/or if at least one defined condition for this is met. Therefore, a coasting phase of the vehicle in the form of a recuperation designed or to be referred to as forced recuperation can be actively switched and/or triggered and thus performed by the system, i.e. by the at least one control unit, for example automatically.

In a subsequent second processing step, an assistance of a possible forced recuperation is offered in dependence on the traffic located and/or prevailing directly around the ego vehicle using data or information of at least one camera of the ego vehicle designed as a front camera and/or as a reversing camera, for example road traffic, wherein the data of the at least one camera are also used in addition to those of the drone. If the drone recognizes in a forecast that recuperation can be initiated prematurely and surroundings around the ego vehicle, wherein these surroundings comprise further road users, for example third-party vehicles, will not thus experience any obstruction and, for example, following traffic will not be unnecessarily obstructed and/or decelerated, the forced recuperation is performed as forced recuperation in an automated manner and/or with the consent of the driver.

In one possible embodiment of the method, "drive along a selected route with forced recuperation from drone viewpoint", i.e. from the viewpoint or perspective of the drone is signaled and offered or proposed to the driver of the ego vehicle in a menu item of the navigation system. Alternatively or additionally, drone assistance or assistance of the drone is signaled and thus offered to the driver in the form of a drive select mode similar to the setting for another mode, for example efficiency mode.

In the method, at least one traffic situation, for example multiple traffic situations, is predicted or forecast by using the drone. In consideration of the at least one predicted traffic situation, the recuperation can be predictively monitored and thus controlled and/or regulated.

At least one kinematic parameter of at least one road user, for example its position or location, its velocity and/or acceleration, which is acquired by the at least one camera of the drone, and thus a position change of road users can be taken into consideration. By taking into consideration the at least one kinematic parameter, an efficiency of the recuperation or a recuperation phase can be increased for the ego vehicle.

In this way, inter alia, the driver can be assisted by the method in making a decision with respect to performing recuperation and thus any human weakness of the driver in making the decision is optimized, wherein, inter alia, a dead time until initiating a respective recuperation phase can be reduced.

In a further embodiment, an optical and/or acoustic display unit, for example a display panel or display screen and/or a loudspeaker of the vehicle, is also used as a component of the system. A predictive display screen or a display panel designed to display a prediction can assist the driver in anticipating the traffic situation, wherein a mental load and an incorrect decision accompanying this with respect to an action and/or decision of the driver to perform the recuperation or for a recuperation activity are reduced. A decision inertia due to a human "move-and-wait weakness" or corresponding waiting or delay with respect to performing the recuperation can be reduced, wherein a recuperation output and thus an amount of electrical energy which can be recuperated increase, wherein a range of the ego vehicle also increases, because a latency time or response time decreases. The response time in turn influences an ability of the driver to think and decide to initiate an efficiency-increased recuperation phase A presence of other road users, for example further third-party vehicles which are accompanying the ego vehicle, coming toward it, and/or intersecting it, can also change very rapidly in a directionally-dependent manner around the ego vehicle in the traffic situation. In the method, a prediction or traffic location of the traffic situation is promoted, wherein future positions of road users can be exactly defined and/or predicted. In this case, an accuracy of a recognition of an object as a road user is improved using the drone in real time for more realistic assessment of the driver of the ego vehicle to initiate the recuperation. Deficits in the calculation and visualization of predicted road users using solely tele-operated devices can be reduced, since the future traffic situation, for example future positions of road users, is predicted in the method.

Using the method, the vehicle can be intentionally recuperated in consideration of the predicted traffic and thus braked, without obstructing further road users in this case, wherein braking energy of the ego vehicle is reclaimed, wherein the movement energy released during the braking of the ego vehicle is converted into electrical energy and the range of the ego vehicle is thus maximized.

Until now, for example a coasting recuperation has been able to be controlled by the driver by using a shift lever or shift pedal, which is arranged on the steering wheel, for example, wherein the recuperation or a coasting mode is manually initiated in dependence on the development of the traffic situation, wherein a forecast of the driver, i.e., the position of his view originating from the driver seat in the travel direction, is decisive. The position of the view and thus a perspective on the traffic is expanded by the method by using the drone. It is thus now possible using the drone to improve a forecast of the traffic and/or enable it at all and to use recuperation reserves even on a confusing, for example very curvy route and/or in the event of bad weather or bad weather conditions. A respective recuperation reserve results if a reserve capacity for further travel-accompanying storage of electrical energy is present in the at least one electrical energy storage unit. The opportunity for recuperation can thus be recognized even more efficiently and the range of the ego vehicle can be extended. In the method, a better forecast of the traffic situation along a selected route, for example a travel route, can be improved using the drone.

It is apparent that the above-mentioned features and the features still to be explained hereinafter are usable not only in the particular specified combination but rather also in other combinations or alone, without leaving the scope of the present disclosure.

BRIEF DESCRIPTION OF THE DRAWINGS

The disclosure is illustrated schematically in the set of drawings on the basis of embodiments, and will be described schematically and in detail with reference to the drawings.

FIG. 1 shows a schematic representation of an embodiment of the system according to the disclosure when performing an embodiment of the method according to the disclosure for performing recuperation of an ego vehicle.

The figures are described coherently and comprehensively; the same components are assigned the same reference numbers.

DETAILED DESCRIPTION

FIG. 1 shows a schematic representation of a vehicle designed or to be referred to as an ego vehicle 2, a motor vehicle or automobile here, which has a control unit 4, an antenna 6, and at least one camera 8 for acquiring traffic or a traffic situation in a travel direction of the ego vehicle 2 in front of the ego vehicle 2 and/or behind the ego vehicle 2. It is provided here that the ego vehicle 2 is controlled and/or steered by a driver 10. The ego vehicle 2 moves here during travel along or on a route 12, which is defined by a roadway and/or road, in its travel direction. Moreover, FIG. 1 shows a drone 14 and thus an unmanned aircraft (unpiloted air vehicle, UAV) 14, wherein this drone 14 has a camera system having multiple cameras 16, 18 and an antenna 20. It is provided here that the drone 14 and its cameras 16, 18 as well as the at least one camera 8 of the ego vehicle 2 and its control unit 4 are also designed as components of the embodiment of the system 22 according to the disclosure and are used or employed to perform the embodiment of the method according to the disclosure.

Several third-party vehicles 24, 26 are also located on the road 12 traveled by the ego vehicle 2 as further vehicles, motor vehicles here, which form further road users of the traffic and/or a traffic situation, in which the ego vehicle 2 is located on and/or along the route 12. It is provided here that a first third-party vehicle 24 is located on and/or along the route 12 behind the ego vehicle 2 in relation to the travel direction of the ego vehicle 2 and thus follows it, wherein this first third-party vehicle 24 is located on a section of the route 12 which has already been traveled by the ego vehicle 2. A second third-party vehicle 26 drives ahead of the ego vehicle 2 on and/or along the route 12 and is accordingly located on a section of the route 12 which is still to be traveled or will be traveled in future by the ego vehicle 2.

In the embodiment of the method, the driving ego vehicle 2 is accompanied by the flying drone 14. It is provided here that the drone 14 is located at a height above the route 12 or roadway, wherein the height is indicated here by a vertically oriented double arrow 28. In addition, the drone 14 is located here at a distance, indicated by a horizontal double arrow 30, with respect to the travel direction of the ego vehicle 2 behind this ego vehicle 2 and flies behind it. However, it is also possible that the drone 14 flies directly over or above the ego vehicle 2 and does not have a horizontally oriented distance or offset to the ego vehicle 2 in this respect. However, it is also conceivable that the drone 14 flies ahead of the ego vehicle 2 and is thus located in a vertically oriented distance in front of the ego vehicle 2 with respect to the travel direction thereof.

In the embodiment of the method, the traffic or the traffic situation in which the ego vehicle 2 is located at a moment is acquired and/or recorded using the cameras 16, 18 of the drone 14. In this case, a first camera 16 of the drone 14 is oriented at the moment in the travel direction of the ego vehicle 2, wherein the second third-party vehicle 26, which drives ahead of the ego vehicle 2, is acquired using this first camera 16, wherein the traffic or the traffic situation in the travel direction in front of the ego vehicle 2 is also acquired using the first camera 16. Correspondingly, the first third-party vehicle 24 following the ego vehicle 2 is acquired or recorded using a second camera 18, which is oriented at the moment against the travel direction of the ego vehicle 2, and the traffic or the traffic situation in the travel direction of the ego vehicle 2 behind the ego vehicle 2 is thus also acquired.

Images of the traffic or traffic situation recorded or acquired by the cameras 16, 18 of the drone 14 are provided here to the control unit 4 via radio 32 or via electromagnetic waves, wherein signals provided for this purpose, which comprise the images and corresponding data or information on the traffic, are transmitted from the antenna 20 of the drone 14 to the antenna 6 of the ego vehicle 2. The images, data, and information on the traffic or traffic situation acquired at the moment by the cameras 16, 18 of the drone 14 are processed by the control unit 4 of the ego vehicle 2, wherein a future development of the traffic or the traffic situation, in which the ego vehicle 2 is located, is forecast or predicted on the basis thereof by the control unit 4. In this case, a recuperation is effectuated and/or controlled by the control unit 4 using such a forecast or prognosis or prediction about the future traffic situation in front of the ego vehicle 2 and behind the ego vehicle 2 for the ego vehicle 2, in which it is provided that the electrical machine (not shown in greater detail) of the ego vehicle 2 is operated as a generator, wherein mechanical energy of the ego vehicle 2 is converted by the electrical machine into electrical energy and stored in an electrical energy storage unit (not shown in greater detail) of the ego vehicle 2, for example a battery. It is to be taken into consideration here that the ego vehicle 2 is braked and thus negatively accelerated during such a recuperation, whereby its velocity is reduced. The recuperation is performed, for example planned, effectuated, and/or initiated, in consideration of the traffic situation acquired at the moment and the future traffic situation derived or predicted therefrom.

It is taken into consideration in the design of the method in this case that the ego vehicle 2 does not come into conflict during the recuperation with other road users, i.e. other third-party vehicles 24, 26. In this case, the recuperation is only performed at a future time starting from the moment at which the traffic situation is acquired by the cameras 16, 18 of the drone 14 if there is a sufficient safety distance behind the ego vehicle 2 to an third-party vehicle 24, 26 with respect to the travel direction of the ego vehicle 2.

The ego vehicle 2, which is driven or propelled by the electrical machine, can also be designed or referred to as an electric vehicle or hybrid vehicle. The ego vehicle 2 is accompanied here along the predefined route 12 by the flying drone 14 at a specific definable distance and a specific definable height, wherein the drone 14 has a better overview of the traffic situation presently prevailing at the moment or a corresponding traffic situation due to its relative spatial arrangement in relation to the ego vehicle 2. In the method, with the aid of the data, images, and information recorded and processed in real time on the current traffic situation, for example, a current traffic density is also acquired. In consideration of the traffic situation acquired in this way on the basis of the data recorded and processed in real time and also in consideration of navigation data which are acquired by a navigation device (not shown in greater detail) of the ego vehicle 2 with respect to the route 12, a better forecast for reasonably carrying out the recuperation is provided, for example in the form of a forced recuperation and thus a coasting phase of the ego vehicle actively shifted or shiftable for this purpose.

It is additionally possible in this case that further data on the traffic situation are provided from the perspective of the ego vehicle 2 using the at least one camera 8 of the ego vehicle 2, which is designed or is to be referred to as a front camera and/or reversing camera, which are also taken into consideration in the predictive performance of the recuperation. It is possible in the scope of the method to acquire the traffic situation or road traffic in which the ego vehicle 2 is located. It is possible here, inter alia, for the drone 14 to recognize in advance using the cameras 16, 18 that recuperation can be performed and/or initiated prematurely without further road users, third-party vehicles 24, 26 here, in the surroundings of the ego vehicle being obstructed by the ego vehicle during performance of the recuperation. Therefore, for example taking into consideration the safety distance, a following third-party vehicle 24 being obstructed and/or decelerated during the recuperation of the ego vehicle 2, for example, is avoided. If an obstruction of third-party vehicles 24, 26 can be ruled out during the recuperation to be performed, the recuperation is effectuated and performed by the control unit 4 automatically or in an automated manner and/or with the consent of the driver 10.

Furthermore, it is possible that the ego vehicle 2 and/or the drone 14 provides a signal, having information that the recuperation is being performed or is to be performed for the ego vehicle 2, to the at least one further road user, i.e., the third-party vehicles 24, 26, in particular the following third-party vehicle 24 via electromagnetic waves, for example while performing a vehicle-to-vehicle or car-to-car communication. A driver of the respective third-party vehicle 24, 26 can thus prepare for the ego vehicle 2 to reduce its velocity due to the recuperation to be performed.

The invention claimed is:

1. A method for performing recuperation for an ego vehicle located on a road with a plurality of third party vehicles, the method comprising:
 providing a drone which has at least two cameras that is configured to fly above the road in proximity to the ego vehicle;
 acquiring, with a first camera of the drone, traffic on the road in the front of the ego vehicle;
 acquiring, with a second camera of the drone, traffic on the road behind the ego vehicle;
 performing recuperation for the ego vehicle based on both the traffic on the road in the front of the ego vehicle and the traffic on the road behind the ego vehicle, wherein the recuperation comprises driving along a selected route on the road with forced recuperation based upon current traffic from a viewpoint of the drone and predicted traffic determined based on the current traffic.

2. The method as claimed in claim 1, further comprising:
analyzing the traffic on the road in the front of the ego vehicle based on a third party vehicle located on the road in the front of the ego vehicle; and
analyzing the traffic on the road behind the ego vehicle based on a third party vehicle located on the road behind the ego vehicle.

3. The method as claimed in claim 2, further comprising:
determining at least one kinematic parameter of the plurality of third party vehicles on the road that are in proximity to the ego vehicle.

4. The method as claimed in claim 2, further comprising:
performing the recuperation along a section of the road in a future travel direction of the ego vehicle, wherein a future traffic situation and/or the recuperation in dependence thereon is predicted on the basis of a traffic situation acquired by the drone.

5. The method as claimed in claim 2, further comprising:
performing the recuperation only when there is a safety distance in a travel direction behind the ego vehicle in relation to each third party vehicle behind the ego vehicle that is in proximity to the ego vehicle.

6. The method as claimed in claim 2, further comprising:
providing a signal to each third party vehicle in proximity to the ego vehicle which informs a driver of each third party vehicle that the recuperation is being performed for the ego vehicle.

7. The method as claimed in claim 1, further comprising:
determining at least one kinematic parameter of the plurality of third party vehicles on the road that are in proximity to the ego vehicle.

8. The method as claimed in claim 7, further comprising:
performing the recuperation along a section of the road in a future travel direction of the ego vehicle, wherein a future traffic situation and/or the recuperation in dependence thereon is predicted on the basis of a traffic situation acquired by the drone.

9. The method as claimed in claim 7, further comprising:
performing the recuperation only when there is a safety distance in a travel direction behind the ego vehicle in relation to each third party vehicle behind the ego vehicle that is in proximity to the ego vehicle.

10. The method as claimed in claim 7, further comprising:
providing a signal to each third party vehicle in proximity to the ego vehicle which informs a driver of each third party vehicle that the recuperation is being performed for the ego vehicle.

11. The method as claimed in claim 1, further comprising:
performing the recuperation along a section of the road in a future travel direction of the ego vehicle, wherein a future traffic situation and/or the recuperation in dependence thereon is predicted on the basis of a traffic situation acquired by the drone.

12. The method as claimed in claim 11, further comprising:
performing the recuperation only when there is a safety distance in a travel direction behind the ego vehicle in relation to each third party vehicle behind the ego vehicle that is in proximity to the ego vehicle.

13. The method as claimed in claim 1, further comprising:
performing the recuperation only when there is a safety distance in a travel direction behind the ego vehicle in relation to each third party vehicle behind the ego vehicle that is in proximity to the ego vehicle.

14. The method as claimed in claim 1, further comprising:
providing a signal to each third party vehicle in proximity to the ego vehicle, which informs a driver of each third party vehicle that the recuperation is being performed for the ego vehicle.

15. A system comprising:
a drone which has at least two cameras; and
at least one control unit, wherein the drone is configured to fly above a road in proximity to an ego vehicle, wherein a first camera of the drone is configured to acquire traffic on the road in the front of the ego vehicle, a second camera of the drone is configured to acquire traffic on the road behind the ego vehicle, and the at least one control unit is configured to instruct the ego vehicle to perform recuperation based on both the traffic on the road in the front of the ego vehicle and the traffic on the road behind the ego vehicle, wherein the recuperation comprises driving along a selected route on the road with forced recuperation based upon current traffic from a viewpoint of the drone and predicted traffic determined based on the current traffic.

* * * * *